United States Patent
Gu

(10) Patent No.: US 11,390,739 B2
(45) Date of Patent: Jul. 19, 2022

(54) THERMOPLASTIC ELASTOMER COMPOUNDS EXHIBITING LOW COMPRESSION SET PROPERTIES

(71) Applicant: PolyOne Corporation, Avon Lake, OH (US)

(72) Inventor: Jiren Gu, Crystal Lake, IL (US)

(73) Assignee: Avient Corporation, Avon Lake, OH (US)

( * ) Notice: Subject to any disclaimer, the term of this patent is extended or adjusted under 35 U.S.C. 154(b) by 272 days.

(21) Appl. No.: 16/606,448

(22) PCT Filed: Apr. 27, 2018

(86) PCT No.: PCT/US2018/029800
§ 371 (c)(1),
(2) Date: Oct. 18, 2019

(87) PCT Pub. No.: WO2018/200957
PCT Pub. Date: Nov. 1, 2018

(65) Prior Publication Data
US 2021/0122914 A1  Apr. 29, 2021

Related U.S. Application Data

(60) Provisional application No. 62/491,536, filed on Apr. 28, 2017.

(51) Int. Cl.
*C08L 53/02* (2006.01)
*B32B 25/08* (2006.01)
*B32B 25/14* (2006.01)

(52) U.S. Cl.
CPC ............ *C08L 53/025* (2013.01); *B32B 25/08* (2013.01); *B32B 25/14* (2013.01); *C08L 53/02* (2013.01); *B32B 2250/02* (2013.01); *B32B 2250/24* (2013.01); *C08L 2205/035* (2013.01); *C08L 2205/06* (2013.01); *C08L 2207/04* (2013.01); *C08L 2207/322* (2013.01)

(58) Field of Classification Search
CPC .... C08L 53/025; C08L 53/02; C08L 2205/06; C08L 2207/322; C08L 2205/035; C08L 2207/04; B32B 25/08; B32B 25/14; B32B 2250/24; B32B 2250/02
USPC ......................................................... 428/412
See application file for complete search history.

(56) References Cited

U.S. PATENT DOCUMENTS

| | | | |
|---|---|---|---|
| 9,120,923 B2 | 9/2015 | Kim | |
| 10,329,417 B2 | 6/2019 | Gu | |
| 10,329,418 B2 | 6/2019 | Gu | |
| 2005/0197447 A1* | 9/2005 | Gu | ............................ C08F 8/00 524/505 |
| 2012/0037396 A1* | 2/2012 | Gu | .......................... C08L 71/12 174/110 AR |
| 2016/0230000 A1 | 8/2016 | Gu | |

FOREIGN PATENT DOCUMENTS

| | | | |
|---|---|---|---|
| CN | 103788562 A | | 5/2014 |
| CN | 106009464 A | * | 10/2016 |
| CN | 106009464 A | | 10/2016 |
| WO | 2014194155 A1 | | 12/2014 |
| WO | 2016077132 A1 | | 5/2016 |

OTHER PUBLICATIONS

Translation of CN 106009464, Oct. 12, 2016. (Year: 2016).*

* cited by examiner

*Primary Examiner* — Hui H Chin
(74) *Attorney, Agent, or Firm* — Emily E. Vlasek

(57) ABSTRACT

A tackifier to modify the Tan Delta of midblock segments of a hydrogenated styrenic block copolymer in a thermoplastic elastomer compounds aids in rendering the HSBC TPE more effective as an overmolding compound having a low percentage compression set value when measured at the high temperature compression set standard. The HSBC TPE can overmold effectively upon polar polymeric substrates depending on the bonding agent chosen.

13 Claims, No Drawings

THERMOPLASTIC ELASTOMER COMPOUNDS EXHIBITING LOW COMPRESSION SET PROPERTIES

CLAIM OF PRIORITY

This application claims priority from U.S. Provisional Patent Application Ser. No. 62/491,536 filed on Apr. 28, 2017, which is incorporated by reference.

FIELD OF THE INVENTION

This invention relates to thermoplastic elastomers containing functional additives to provide low compression set properties for use in overmolding.

BACKGROUND OF THE INVENTION

The world of polymers has progressed rapidly to transform material science from wood and metals of the 19th Century to the use of thermoset polymers of the mid-20$^{th}$ Century to the use of thermoplastic polymers of the later 20th Century.

Crosslinked rubbers have low high temperature compression set (CS), and they are adopted for majority of gasket/sealing applications. An overmolding (OM) TPE gasket would by highly preferred for many electronic applications due to complex sealing design and assembly requirements.

There are TPEs grades with excellent low CS at high temperature. However, low CS TPEs are mostly non-OM grade or OM grade with weak bonding. There are many OM TPE grades with excellent bonding to PC or nylon, but majority of them have poor high temperature CS and are not suitable for sealing. There is a lack of TPEs with both robust OM bonding to polycarbonate or nylon and also a low high temperature CS.

SUMMARY OF THE INVENTION

What the art needs is a TPE with both robust OM bonding and to polycarbonate or nylon and also a low high temperature compression set.

"Compression set" is identified by ASTM D395 to be the permanent deformation remaining after release of a compressive stress. Compression set is expressed as the percentage of the original specimen thickness for Method A (constant force) or the percentage of the original deflection for Method B (constant deflection). Compression set is an important property for elastomers and cushioning materials. For purposes of this invention, Method B will be used.

Generally, the lower the compression set percentage, the better the TPE compound can withstand stress and return to its prior normal condition. Therefore, a lower compression set percentage is indicative of superior elastomeric performance.

Compression set can be expressed as:

$$C_B = [(t_o - t_i)/(t_o - t_n)] \times 100$$

where $C_B$=Compression set; $t_o$=Original thickness of the specimen; $t_i$=Final thickness of the specimen; and $t_n$=thickness of the space bars used.

Compression set can be measured at different temperatures, for example at 23° C. and at 70° C. The Examples were tested at the higher temperature over a duration of 22 hours using ASTM D395 Test Method B.

A high "high temperature CS" means poor recovery from compression at the higher test temperature of 70° C. For example, 100% CS refers to 100% permanent deformation after the test and a total loss of sealing capacity. Having a low "high temperature CS" means good recovery from compression at the higher test temperature of 70° C. For example, 0% CS refers to no permanent deformation after the test and a total recovery from compression. Having a low percentage CS is preferred for a gasket/sealing application.

The present invention solves the problem in the art by using a TPE formulation which utilizes different types of thermoplastic elastomers together with a number of functional additives which combine to provide both robust overmolding properties and also a low "high temperature CS."

One aspect of the invention is a thermoplastic elastomer compound, comprising: (a) hydrogenated styrenic block copolymer; (b) oil; (c) more than 30 parts of a midblock tackifier per one hundred parts of the copolymer; and (d) bonding agent for overmolding of the thermoplastic elastomer compound to a polar polymeric substrate, wherein the compound has a compression set of less than about 50% when tested at 70° C. for 22 hours using ASTM D395 Test Method B.

Another aspect of the invention is a molded article of the above compound overmolded on a polar polymeric substrate.

Features of the invention will become apparent with reference to the following embodiments.

EMBODIMENTS OF THE INVENTION

Study of Compression Set of Various Possible Ingredients

To provide an OM TPE acceptable to the market, the following are factors to be considered for an OM TPE to be used for gasket/sealing in the consumer electronic market.

Hardness: 40-60 Shore A, preferable 40-50 Shore A

Compression @70° C.: below 50%

Excellent flow for high L/D ratio design

Good OM bonding: robust bonding at high L/D ratio and low TPE thickness design. TPE thickness can be at 0.3-3 mm range.

Thermal stability in a molding machine at high barrel temperature and long residence time.

Compression Set of Bonding Agents

Most soft OM TPEs are a styrene block copolymer (SBC) compound. To achieve strong bonding with cohesive failure, bonding agents such as thermoplastic polyurethane (TPU) and copolyester elastomer (COPE) are often adopted for polar substrates such as polycarbonate (PC), a blend of polycarbonate and acrylonitrile butadiene styrene (PC/ABS), and a blend of polycarbonate and polybutadiene terephthalate (PC/PBT).

Unfortunately, bonding agents, such as TPU and COPE, are plastics and do not have good 70° C. CS. Examples of compression set values for bonding agent at 70° C. for 22 hours are Hytrel™ 3078 COPE (82 Shore A): 60% tested at 15% compression and is too stiff for 25% compression and Irogran 4394 TPU (85 Shore A) with 75% tested at 25% compression. It is also noted that these results are reported after testing without annealing, a process which is impractical for use of TPU as a bonding agent for an overmolded gasket article.

For low CS OM TPE, the bonding agent can only be used at low weight percentage due to its poor CS.

Compression Set of Styrenic-Block Copolymers

The CS of a SBC compound is related to its Mw. Typical high Mw hydrogenated SBC (Mw 300K) ("HSBC") compound has 70° C. CS at 30-40% range. Typical low Mw HSBC (Mw 100K) compound has 70° C. CS close to 100%.

Study of Overmolding/Overmolded Wetting

Good wetting of the TPE at the surface of the substrate is significant to achieve good bonding either thorough use of covalent bonding or chemical compatibility.

The typical bonding agents of TPU and COPE are plastics, and they can provide good wetting at melt status. Good wetting can be demonstrated on smooth and gloss surface of TPU and COPE molded plaques.

High Mw HSBC (300K) is known to have poor wetting at a polycarbonate or polyamide substrate and is not suitable used as a major elastomer component for a formulation for overmolding.

Low Mw HSBC (100K) is known to have good wetting and therefore a low Mw SBC is often used for a formulation of TPE used for overmolding, but that low Mw SBC has a poor 70° C. CS.

For this purpose, an acceptable formulation uses a high Mw HSBC (weight average Mw 300K and above), oil, tackifier, and hardening agent as elastomer components in a soft phase of major amount of the overall formulation and a bonding agent as a hard phase of minor amount of the overall formulation. The lower percentage of bonding agent percentage is preferred due to its weak CS. The bonding agent can be TPU or COPE for polar substrate plastics or maleic polymer for nylon substrates.

Due to poor wetting, high Mw HSBC (Mw 300 and above) is not used as a major elastomer component in most of OM grades. As a result, there is lack of OM TPE grades with both good high temperature CS and robust bonding for good overmolding uses.

A robust OM technology is identified herein, using high Mw HSBC (Mw 300K and above) as major elastomer component and bonding agent (COPE or TPU) as minor component. It has robust bonding for thin wall (less than 1 mm and preferably less than 0.5 mm) and high L/D (100 L/D) designed overmolding, as well as good 70° C. CS below 50%. The invention can be used for overmolding of polar substrates such as polycarbonate and nylon, respectively.

Because poor wetting is correlated to weak bonding, the objective is to use high Mw SBC (Mw 300K or above) a minimal flow mark TPE.

"Flow mark" means the appearance of a tiger strip marking on plaque surface, assessed via a visual judgment by comparison to a typical flow mark of a SEBS compound having a different Mw. Examples of different flow mark TPEs are Kraton G1651 (Mw 300K, high flow mark), Kraton G1654 (Mw 200K, middle flow mark), and Kraton G1650 (Mw 100K, low or no flow mark). It is possible to extrapolate flow improvement by (a) viscosity reduction and (b) a reduced Tg difference between the styrene end blocks and the ethylene/butylene midblock by raising the Tan Delta of the midblock. Narrowing the gap between the Tg of the end blocks and the Tg of the midblock corresponds to reduced elasticity of a hydrogenated block copolymer (HSBC) such as SEBS and a better flow as correlated by a reduction in viscosity of the HSBC.

Selection of TPEs

It has been found significant in this invention to raise the Tan Delta of the midblock of the SBC, thereby reducing the difference between the Tan Deltas of the end blocks and the middle block. The reduction of that Tan Delta difference reduces elasticity at melt status, which results in a reduction of viscosity, a reduction in flow mark, and better wetting of the interface between the TPE overmolding compound and the polycarbonate or polyamide substrate.

The glass transition temperature (Tg) of a styrenic end block is about 100° C. The Tg of various middle blocks of different type of HSBCs is reported in Table 1.

TABLE 1

Midblock Properties of TPEs

| | Tg, C. |
|---|---|
| Standard SEBS such as Kraton ™ G1651 (Kraton) with an ethylene-butylene midblock | −42 |
| High vinyl SEBS Kraton ™ G1641 (Kraton) with an ethylene-butylene midblock | −38 |
| High vinyl SEPS Hybrar 7135 (Kuraray) with a hydrogenated vinyl-polyisoprene midblock | −15 |
| SEEPS Septon ™ 4055 (Kuraray) with an ethylene-ethylene/propylene-styrene midblock | −56 |

Based on the results of the experiments utilized styrene-ethylene-butylene-styrene (SEBS); styrene-ethylene-ethylene-propylene-styrene (SEEPS) styrene-isoprene/butadiene-styrene (SIBS); styrene-ethylene-propylene-styrene (SEPS); and styrene-isoprene-styrene (SIPS). Desirably, "high vinyl content" grades of these TPEs can be used. "High vinyl" means that at least 51 mole % (percent) of the butadiene midblock is polymerized at the 1,2-position, and at least 51 mole % of the isoprene, if present, is polymerized at the 3,4-position by "driving" the polymerization with addition of a polar compound, as is well known in the art; typically the maximum in each case is 90 mole %. Such HSBCs are referred to as "high vinyl" HSBCs whether either butadiene or isoprene, or both, are present in the midblock. Examples of a hydrogenated high 1,2-HSBCs are disclosed in U.S. Pat. No. 5,777,031 to Djiauw et al the disclosure of which is incorporated by reference thereto as if fully set forth herein.

Other candidate TPEs are within the contemplation of use in this invention, depending on common properties with the midblock segments of the TPEs as seen in Table 1. Table 3 shows commercial sources for the TPEs employed in the Examples.

Tan Delta of middle block of the TPE can be modified with tackifier. The efficiency of Tan Delta shift is related to compatibility and Tg of tackifier. A high soft point tackifier is preferred, with "high soft point" being defined as a ring and ball softening point (RBSP) as explained by Eastman Chemical at Eastman.com/Markets/Tackifier_Center/Tackifier_Selection/Compatibility/Pages/Softening_Point.aspx.

Different amounts of tackifier may be required for different types of SBCs being used for the seal or gasket end use article. Generally, the higher the Tg of the midblock of the SBC, the lower the amount of tackifier required.

One commercially available and suitable tackifier is Plastolyn™ R1140 tackifier is an amorphous, low-molecular-weight hydrocarbon resin derived from aromatic petrochemical feedstocks. The resin is fully hydrogenated to a saturated cyclo-aliphatic structure that is highly compatible with polyolefin polymers. This resin is suggested by Eastman Chemical, its manufacturer, for use as a modifier of polyolefin polymers.

Other examples of commercially available high softening point tackifiers include hydrogenated hydrocarbon resins available under the ARKON brand, such as grades P100, P115, P125, and P140, from Arakawa Chemical Industries, Ltd.; hydrogenated hydrocarbon resins available under the EASTOTAC brand, such as grades H-125-W, H-140-W, and H-142-W, from Eastman Chemical Company; hydrogenated hydrocarbon resins available under the PLASTOLYN brand, such as grades other than R1140 mentioned above, from Eastman Chemical Company; and hydrogenated hydrocarbon resins available under the REGALREZ brand, such as grade 1139, also from Eastman Chemical Company.

Optional Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as Plastics Additives Database (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; dispersants; fillers and extenders; fire and flame retardants and smoke suppressants; hardness adjusters; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them. Of these optional additives, mineral oil, hardness adjusters, waxes and antioxidants are often used.

Generally, minor amounts of such additives provide improvement of performance to the compound during processing with the other ingredients in the polymer resin or in performance of the polymeric molded article after manufacturing. One skilled in the art without undue experimentation can determine the appropriate concentration.

Table 2 shows the acceptable and desirable ranges of ingredients for the compound of the present invention, all expressed in weight percent (wt. %) of the entire compound and alternatively in parts per one hundred parts of TPE resin (PHR). The compound can comprise, consist essentially of, or consist of the following ingredients. Any number between the ends of the ranges is also contemplated as an end of a range, such that all possible combinations are contemplated within the possibilities of Table 2 as candidate compounds for use in this invention.

TABLE 2

| Ranges of Ingredients | | | |
|---|---|---|---|
| Ingredient | Acceptable | Desirable | Preferable |
| (Wt. Percent) | | | |
| TPE (single HSBC or blends of HSBC) | 20-60 | 25-50 | 25-45 |
| Midblock Tackifier | 10-40 | 12-35 | 15-30 |
| Oil | 10-40 | 12-35 | 15-30 |
| Bonding agent for overmolding | 20-60 | 25-50 | 35-45 |
| Hardness Modifier (PP or PE) | 0-18 | 0-10 | 0-5 |
| Wax | 0-1 | 0-0.5 | 0-0.3 |
| Anti-oxidant | 0-1 | 0-0.5 | 0-0.3 |
| (PHR) | | | |
| TPE (single HSBC or blends of HSBC) | 100 | 100 | 100 |
| Midblock Tackifier | 30-130 | 40-110 | 50-90 |
| Oil | 30-130 | 40-110 | 50-90 |

TABLE 2-continued

| Ranges of Ingredients | | | |
|---|---|---|---|
| Ingredient | Acceptable | Desirable | Preferable |
| Bonding agent for overmolding | 60-200 | 75-175 | 90-150 |
| Hardness Modifier (PP or PE) | 0-60 | 0-45 | 0-30 |
| Wax | 0-3 | 0-2 | 0-1 |
| Anti-oxidant | 0-3 | 0-2 | 0-1 |

Processing

The preparation of compounds of the present invention is uncomplicated. The TPE compound can be made in batch or continuous operations.

Mixing in a continuous process typically occurs in an extruder that is elevated to a temperature that is sufficient to melt the polymer matrix with addition at the head of the extruder. Extruder speeds can range from about 50 to about 500 revolutions per minute (rpm), and preferably from about 300 to about 500 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (Elsevier.com), one can make articles of any conceivable shape and appearance using compounds of the present invention.

Compounds for Overmolded Substrate

Any durable polymer capable of being injection molded and have rigidity more than the overmolding TPE layer is a candidate for use in the present invention. Without undue experimentation, one having ordinary skill in the art could formulate a compound suitable for injection overmolding in a fashion to determine the adhesion peel strength of the overmolding TPE layer thereto.

As stated previously, polar substrates, such as those containing polycarbonate, polyamide (also called nylon), are already identified as suitable substrates for TPE overmolding in making consumer electronic parts.

However, because the overmolding layer is made of TPE, it is logical that acceptable compounds for the overmolded substrate could also be made of TPE, preferably either the same or similar as the TPE resin in the overmolding layer, except for the presence of the oil in the overmolding layer to provide flexibility.

All of the various possible TPE compounds described for use in the overmolding layer are also possible compounds for the rigid overmolded substrate, again less the plasticizer or any other additive detracting from the durability and structural integrity, melt flow, and other requirements of processing, performance or both.

Overmolding Processing

Those having ordinary skill in the art of polymer processing, particularly injection overmolding processing, can recognize that the equipment for injection overmolding of a flexible layer to a rigid substrate of other polymers can also be applicable to TPE overmolding layers on to polymeric substrates.

Injection overmolding typically has ranges of settings as seen in Table 3, when TPE is used.

TABLE 3

| Molding Condition | PC Acceptable | PC Preferred | Nylon Acceptable | Nylon Preferred |
|---|---|---|---|---|
| Rear Barrel Temperature, ° F. | 330-350 | 340-350 | 320-400 | 350-380 |
| Center Barrel Temperature, ° F. | 330-350 | 340-350 | 400-480 | 360-440 |
| Front Barrel Temperature, ° F. | 330-350 | 340-350 | 400-500 | 420-480 |
| Nozzle Barrel Temperature, ° F. | 330-350 | 340-350 | 400-500 | 420-480 |

Other variables for molding conditions are dependent on either the machine or the nature of the part to be molded. Without undue experimentation, a person having ordinary skill in the art can determine these variables for each combination of machine and molded part.

Usefulness of the Invention

Any plastic article made by injection molding is a candidate for use of any laminate of the various overmolding layers and overmolded substrates in combination as disclosed above. Particularly useful are those plastic articles which require both sturdiness and durability from the overmolded substrate and flexibility and tactile benefits from the overmolding layer.

Articles with need for gripping by the human hand lead the likely candidates to be made from the compounds of the present invention. From hand tools to handle bars, from pill containers to ice chests, the combination of performance properties of "over" layer and "under" layer allows for the plastic article designer to utilize formulations contemplated by this disclosure.

The overmolding layer need not cover the entire overmolded substrate. Indeed, there are many situations where the properties of the overmolding layer are detrimental to the outer surface of the exposed overmolded substrate which does not require the flexibility and tactile sensations required at the surfaces of the overmolding layer. For example, one can guide the human hand to the correct location of proper leverage of a hand tool by arranging the overmolding layer to cover the overmolded substrate only at the preferred location. The same concept is also true for golf clubs, axes, exercise equipment, and the like.

Also, the polymeric article need not be only two layers of flexible overmolding layer and rigid overmolded substrate. Different surfaces of the substrate can be overmolded with different flexible overmolding layers to provide more versatility of specialized polymeric materials. For example, a hand tool can have one overmolding layer of one formulation where the palm contacts the tool and a second overmolding layer of a second formulation where the fingers grip the tool. If used in low-light conditions, the flexibility and tactility of the different layers can signal the orientation of the hand tool in the hand.

TPE compounds of the present invention may have a higher compression set percentage than silicone rubber. But these TPEs can be used to replace silicone rubber in overmolding for many consumer electronic goods, requiring water tight sealing applications. In many consumer electronics sealing designs, overmolding is required to operate in a temperature range of from about room temperature to 50° C. Thermoset silicone rubber for overmolding is very expensive and also often over-engineered for its actual end use.

Typical OM TPE overmolding grades have too high a compression set percentage measured at 70° C. (70-100%) and are therefore not adequate for water tight sealing.

This low CS OM TPE technology provides adequate water tight sealing for many of consumer electronic applications at a much lower cost than overmolding using silicone rubber. As such, and with the advantage of being capable of being injection molded and thereafter recycled, plastic articles can be made from formulations of the present invention for such uses as seals, closures, and other articles previously made from OM grades of silicone rubber. Other articles can be made from the TPE compound, such as the following industrial and consumer products: food and drink container seals, printer cartridge seals, and other products needing both flexibility and barrier properties as a suitable replacement for OM grades of silicone rubber.

Consumer electronic products will particularly benefit from this invention, including without limitation, worldwide markets for telephones, speaker, personal training equipment, wristwatches, cameras, audio or video recording devices, etc.

EXAMPLES

Table 4 shows the ingredients for all Examples 1-20 and Comparative Examples A-K, including the composition of the substrates for the testing of overmolding. Table 5 shows the test methods.

Tables 6-11 report the formulations, the processing of the formulations, and the results of experimentation.

Pellets of all Examples 1-20 and Comparative Examples A-K were molded into tensile test bars using a Boy injection molding machine, operating at 235° C. temperature and high pressure for physical property testing.

The same machine was used for overmolding in Series 3-6.

TABLE 4

| Ingredient Name | | |
|---|---|---|
| Chemical | Purpose | Source |
| HYBRAR KL-7135 high Mw (300K) styrene block copolymer with hydrogenated high vinyl-polyisoprene midblock (Kuraray) | TPE | Kuraray |

TABLE 4-continued

Ingredient Name

| Chemical | Purpose | Source |
| --- | --- | --- |
| Kraton G1651 hydrogenated high Mw (300K) styrene ethylene butylene styrene (SEBS) (Kraton) | TPE | Kraton |
| Kraton MD6958 hydrogenated high Mw (380K) high vinyl SEBS (Kraton) | TPE | Kraton |
| Septon 4055 high Mw (300K) styrene (ethylene ethylene propylene) styrene copolymer (SEEPS) (Kuraray) | TPE | Kuraray |
| Septon 4077 high Mw (380K) SEEPS (Kuraray) | TPE | Kuraray |
| Kraton G1641 hydrogenated high Mw (300K) high vinyl SEBS (Kraton) | TPE | Kraton |
| Plastolyn R1140 tackifier (Eastman) | Tackifier for TPE Midblock Segment | Eastman |
| 550 viscosity white mineral oil | Oil | Various |
| Sclair 2908 HDPE (Nova Chemicals) | Hardness Adjust | Nova |
| Sclair 2714 HDPE (Nova Chemical) | Hardness Adjust | Nova |
| Dowlex D2035 LLDPE (Dow) | Hardness Adjust | Dow |
| Skypel G130D copolyester elastomer (SK Chemicals) | Overmolding Adhesion | SK Chemicals |
| Exxelor VA 1801 maleic polyolefin (ExxonMobil) | Overmolding Adhesion | ExxonMobil |
| Vicron 25-11 calcium carbonate (Specialty Minerals) | Filler | Specialty Minerals |
| Kemamide B wax (PMC/Biogenix) | Mold Release | PMC/Biogenix |
| Kemamide E wax (PMC/Biogenix) | Mold Release | PMC/Biogenix |
| Irganox 1010 antioxidant (BASF) | Durability | BASF |
| Irgafos 168 antioxidant (BASF) | Durability | BASF |
| CYCOLOY™ Resin C2950 non-chlorinated and non-brominated flame retardant PC/ABS | Substrate | SABIC |
| BASF Ultramid 8333GHI Polyamide | Substrate | BASF |

TABLE 5

Test Methods

| Name | Published Standard |
| --- | --- |
| Shore A Hardness | ASTM D2240 |
| 200° C. Rheology @ 223 seconds | ASTM D3835 |
| 200° C. Rheology @ 76 seconds | ASTM D3835 |
| Peel Adhesion at 90° on Overmolded Substrate (at 5.08 cm location) (Average of 2 samples) | ASTM D6862 |
| Compression Set @ 70° C. for 22 Hr. | ASTM D395, Method B |
| DMA Tan Delta | Custom test method, 10 Hz |

The custom test method for DMA Tan Delta is based on the use of a Q800 Dynamic Mechanical Analyzer from TA Instruments of New Castle, Del. with settings at a frequency of 10 Hz, operating at a temperature range from −40° C. to 100° C. and a scan rate of 3° C./minute on a sample of 10 mm×10 mm×and 3 mm (thickness) dimensions on a shear sandwich test fixture.

Table 2 presents the ingredients of the compounds in both weight percent of the entire TPE overmolding compound and PHR of the ingredients relative to the TPE ingredient(s). The six Series of experiments identify the ingredient weight percentages and PHR also. However, some uses weight percent for formulating, in fact, by understanding the use of PHR to identify variables among constants, one can determine the constancy of most of the ingredients used across the range of each Series of experiments. For that reason, the following paragraphs identify which ingredients are variable in PHR amount across each Series of experiments.

Series 1 explored the variations of tackifier for the soft midblock segment of the TPE. Computing using 100 PHR of TPE, the only ingredient varied was the tackifier at 0, 30, and 60 PHR. Both of the styrenic block copolymer types having hydrogenated mid-blocks responded well to the increasing content of tackifier. No bonding agent for overmolding was used because no overmolding test was contemplated.

Series 2 explored the same variations of tackifier for two different high vinyl content SEBS copolymers. Again the only variable ingredient was the tackifier at 0, 30, and 60 PHR. Again, both SEBS copolymers with hydrogenated mid-blocks responded well to the increasing content of tackifier. Again, no bonding agent for overmolding was used because no overmolding test was contemplated.

Series 3 explored the reduced (10 PHR) but constant amount of Sclair 2714 HDPE hardness modifier, the addition (100 PHR) but constant amount of the Skypel G130D copolyester elastomer bonding agent, and same variations of tackifier for the same two TPEs as used in Series 2. Series 3 also explored overmolding capabilities, with more than 30 PHR of tackifier being required to have the desired cohesive failure mode.

Series 4 explored the same formulations as Series 3, except that the amount of Skypel G130D was increased to 145 PHR but held constant for all six experiments. Viewed from the perspective of PHR of tackifier, more than 30 PHR was needed, with the results of Comparative Example J and Example 13 using 30 PHR was inconclusive.

Series 5 explored the same formulation as in Series 4, except that Septon 4055 SEEPS was used in place of Kraton G1641H and Kraton MD 6958 SEBS. More than 30 PHR of tackifier was required, as seen in the use of 60 PHR of tackifier as the only example and resulting cohesive failure.

Series 6 explored several variations, with the most prominent being the replacement of Skypel G130D copolyester elastomer bonding agent with Exxolor VA1801 maleic polyolefin for overmolding bonding. Dowlex 2035 HDPE for hardness adjustment replaced the Sclair HDPE. Vicron 25-11 filler was added for the first time in the experiments. The first four experiments of the Series 6 used a 3:1 ratio of SEBS:SEEPS blend for the 100 PHR of resin. The latter two experiments explored a 3:1 ratio of high vinyl SEPS:SEEPS blend. The amount of tackifier in each experiment of the Series 6 used 50 PHR or more, and all of Series 6 resulted in desired cohesive failure.

TABLE 6

Series 1

| Series | 1A | | 1B | | 1C | | 1D | | 1E | | 1F | |
|---|---|---|---|---|---|---|---|---|---|---|---|---|
| Example | A | | 1 | | 2 | | 3 | | 4 | | B | |
| Weight Percent (%) or PHR | % | PHR | % | PHR | % | PHR | % | PHR | % | PHR | % | PHR |
| Kraton G1651 | 45.25 | 100 | 39.84 | 100 | 35.59 | 100 | 0 | 0 | 0 | 0 | 0 | 0 |
| Septon 4077 | 0 | 0 | 0 | 0 | 0 | 0 | 35.59 | 100 | 39.84 | 100 | 45.25 | 100 |
| 550 viscosity oil | 36.2 | 80 | 31.87 | 80 | 28.47 | 80 | 28.47 | 80 | 31.87 | 80 | 36.2 | 80 |
| Plastolyn R1140 | 0 | 0 | 11.95 | 30 | 21.35 | 60 | 21.35 | 60 | 11.95 | 30 | 0 | 0 |
| Scilair 2908 | 18.1 | 40 | 15.94 | 40 | 14.23 | 40 | 14.23 | 40 | 15.94 | 40 | 18.1 | 40 |
| Kemamide E | 0.23 | 0.5 | 0.2 | 0.5 | 0.18 | 0.5 | 0.18 | 0.5 | 0.2 | 0.5 | 0.23 | 0.5 |
| Irganox 1010 | 0.23 | 0.5 | 0.2 | 0.5 | 0.18 | 0.5 | 0.18 | 0.5 | 0.2 | 0.5 | 0.23 | 0.5 |
| Total | 100 | 221 | 100 | 251 | 100 | 281 | 100 | 281 | 100 | 251 | 100 | 221 |
| Mixing Equipment | Twin extruder | | | | | | | | | | | |
| Mixing Temp. | 204° C. (400° F.) | | | | | | | | | | | |
| Mixing Speed | 500 RPM | | | | | | | | | | | |
| Order of Addition of Ingredients | All together | | | | | | | | | | | |
| Form of Product After Mixing | Pellet | | | | | | | | | | | |
| Hardness, Shore A | 62 | | 57 | | 51 | | 54 | | 58 | | 62 | |
| 200° C. Rheology | | | | | | | | | | | | |
| viscosity @ 223/sec | 550 | | 490 | | 415 | | 410 | | 540 | | 620 | |
| viscosity @ 67/sec | 1310 | | 1185 | | 1010 | | 1010 | | 1320 | | 1530 | |
| Tan Delta, temperature, ° C. | <−40 | | −40 | | 3 | | −10 | | −40 | | <−40 | |
| Tan Delta, peak height | N/A | | 0.18 | | 0.37 | | 0.27 | | 0.28 | | N/A | |
| Compression Set at 70° C. (%) | 35 | | 35 | | 31 | | 26 | | 26 | | 32 | |

TABLE 7

Series 2

| Series | 2A | | 2B | | 2C | | 2D | | 2E | | 2F | |
|---|---|---|---|---|---|---|---|---|---|---|---|---|
| Example | 5 | | 6 | | C | | D | | 7 | | 8 | |
| Weight Percent (%) or PHR | % | PHR | % | PHR | % | PHR | % | PHR | % | PHR | % | PHR |
| Kraton MD 6958 | 45.25 | 100 | 39.84 | 100 | 35.59 | 100 | 0 | 0 | 0 | 0 | 0 | 0 |
| Kraton G1641H | 0 | 0 | 0 | 0 | 0 | 0 | 35.59 | 100 | 39.84 | 100 | 45.25 | 100 |
| 550 viscosity oil | 36.2 | 80 | 31.87 | 80 | 28.47 | 80 | 28.47 | 80 | 31.87 | 80 | 36.2 | 80 |
| Plastolyn R1140 | 0 | 0 | 11.95 | 30 | 21.35 | 60 | 21.35 | 60 | 11.95 | 30 | 0 | 0 |
| Scilair 2908 | 18.1 | 40 | 15.94 | 40 | 14.23 | 40 | 14.23 | 40 | 15.94 | 40 | 18.1 | 40 |
| Kemamide E | 0.23 | 0.5 | 0.2 | 0.5 | 0.18 | 0.5 | 0.18 | 0.5 | 0.2 | 0.5 | 0.23 | 0.5 |
| Irganox 1010 | 0.23 | 0.5 | 0.2 | 0.5 | 0.18 | 0.5 | 0.18 | 0.5 | 0.2 | 0.5 | 0.23 | 0.5 |
| Total | 100 | 221 | 100 | 251 | 100 | 281 | 100 | 281 | 100 | 251 | 100 | 221 |
| Mixing Equipment | Twin extruder | | | | | | | | | | | |
| Mixing Temp. | 204° C. (400° F.) | | | | | | | | | | | |
| Mixing Speed | 500 RPM | | | | | | | | | | | |
| Order of Addition of Ingredients | All together | | | | | | | | | | | |
| Form of Product After Mixing | Pellets | | | | | | | | | | | |
| Hardness, Shore A | 52 | | 45 | | 38 | | 39 | | 45 | | 53 | |
| 200° C. Rheology | | | | | | | | | | | | |
| viscosity @ 223/sec | 340 | | 310 | | 240 | | 250 | | 290 | | 335 | |
| viscosity @ 67/sec | 780 | | 710 | | 660 | | 580 | | 700 | | 755 | |
| Tan Delta, temperature, ° C. | −40 | | −30 | | 4 | | 8 | | −30 | | −40 | |
| Tan Delta, peak height | 0.27 | | 0.48 | | 0.45 | | 0.5 | | 0.43 | | 0.3 | |
| Compression Set at 70° C. (%) | 34 | | 31 | | 31 | | 29 | | 33 | | 35 | |

TABLE 8

Series 3

| Series | 3A | | 3B | | 3C | | 3D | | 3E | | 3F | |
|---|---|---|---|---|---|---|---|---|---|---|---|---|
| Examples | E | | F | | 9 | | 10 | | G | | H | |
| Weight Percent (%) or PHR | % | PHR | % | PHR | % | PHR | % | PHR | % | PHR | % | PHR |
| Kraton G1641H | 34.19 | 100 | 31.01 | 100 | 28.37 | 100 | 0 | 0 | 0 | 0 | 0 | 0 |
| Kraton MD 6958 | 0 | 0 | 0 | 0 | 0 | 0 | 28.37 | 100 | 31.01 | 100 | 34.19 | 100 |
| 550 viscosity oil | 27.35 | 80 | 24.81 | 80 | 22.7 | 80 | 22.7 | 80 | 24.81 | 80 | 27.35 | 80 |
| Plastolyn R1140 | 0 | 0 | 9.3 | 30 | 17.02 | 60 | 17.02 | 60 | 9.3 | 30 | 0 | 0 |

TABLE 8-continued

Series 3

| Series | 3A | | 3B | | 3C | | 3D | | 3E | | 3F | |
|---|---|---|---|---|---|---|---|---|---|---|---|---|
| Examples | E | | F | | 9 | | 10 | | G | | H | |
| Scilair 2714 | 3.42 | 10 | 3.1 | 10 | 2.84 | 10 | 2.84 | 10 | 3.1 | 10 | 3.42 | 10 |
| Skypel G130D | 34.19 | 100 | 31.01 | 100 | 28.37 | 100 | 28.37 | 100 | 31.01 | 100 | 34.19 | 100 |
| Kemamide B | 0.65 | 1.9 | 0.59 | 1.9 | 0.54 | 1.9 | 0.54 | 1.9 | 0.59 | 1.9 | 0.65 | 1.9 |
| Irganox 1010 | 0.21 | 0.6 | 0.19 | 0.6 | 0.17 | 0.6 | 0.17 | 0.6 | 0.19 | 0.6 | 0.21 | 0.6 |
| Total | 100 | 292.5 | 100 | 322.5 | 100 | 352.5 | 100 | 352.5 | 100 | 322.5 | 100 | 292.5 |
| Mixing Equipment | Twin extruder | | | | | | | | | | | |
| Mixing Temp. | 193° C. (380° F.) | | | | | | | | | | | |
| Mixing Speed | 500 RPM | | | | | | | | | | | |
| Order of Addition of Ingredients | All together | | | | | | | | | | | |
| Form of Product After Mixing | Pellets | | | | | | | | | | | |
| Hardness, Shore A | 51 | | 45 | | 41 | | 40 | | 43 | | 48 | |
| 200° C. Rheology | | | | | | | | | | | | |
| viscosity @ 223/sec | 340 | | 290 | | 250 | | 240 | | 285 | | 320 | |
| viscosity @ 67/sec | 705 | | 615 | | 590 | | 550 | | 600 | | 740 | |
| Compression Set at 70° C. (%) | 46 | | 45 | | 45 | | 44 | | 42 | | 44 | |
| Substrate | SABIC Cycoloy C2950 PC/ABS | | | | | | | | | | | |
| Barrel temperature, ° C. | 215 | | | | | | | | | | | |
| Thicknesses of TPE and Substrate | Substrate 1.5 mm, OM TPE 1.5 mm, total 3 mm | | | | | | | | | | | |
| Peel force measured location | 5.08 cm (2 inches) | | | | | | | | | | | |
| Force (Newtons/m) (lb/in) | 1051 (6) | | 1401 (8) | | 1576 (9) | | 2452 (14) | | 2102 (12) | | 1051 (6) | |
| Failure mode | Adhesive | | Adhesive | | Cohesive | | Cohesive | | Adhesive | | Adhesive | |

TABLE 9

Series 4

| Series | 4A | | 4B | | 4C | | 4D | | 4E | | 4F | |
|---|---|---|---|---|---|---|---|---|---|---|---|---|
| Examples | I | | J | | 11 | | 12 | | 13 | | K | |
| Weight Percent (%) or PHR | % | PHR | % | PHR | % | PHR | % | PHR | % | PHR | % | PHR |
| Kraton G1641H | 29.71 | 100 | 27.28 | 100 | 25.21 | 100 | 0 | 0 | 0 | 0 | 0 | 0 |
| Kraton MD 6958 | 0 | 0 | 0 | 0 | 0 | 0 | 25.21 | 100 | 27.28 | 100 | 29.71 | 100 |
| 550 viscosity oil | 23.77 | 80 | 21.82 | 80 | 20.17 | 80 | 20.17 | 80 | 21.82 | 80 | 23.77 | 80 |
| Plastolyn R1140 | 0 | 0 | 8.18 | 30 | 15.13 | 60 | 15.13 | 60 | 8.18 | 30 | 0 | 0 |
| Scilair 2714 | 2.97 | 10 | 2.73 | 10 | 2.52 | 10 | 2.52 | 10 | 2.73 | 10 | 2.97 | 10 |
| Skypel G130D | 43.08 | 145 | 39.55 | 145 | 36.56 | 145 | 36.56 | 145 | 39.55 | 145 | 43.08 | 145 |
| Kemamide B | 0.3 | 1 | 0.27 | 1 | 0.25 | 1 | 0.25 | 1 | 0.27 | 1 | 0.3 | 1 |
| Irganox 1010 | 0.18 | 0.6 | 0.16 | 0.6 | 0.15 | 0.6 | 0.15 | 0.6 | 0.16 | 0.6 | 0.18 | 0.6 |
| Total | 100 | 336.6 | 100 | 366.6 | 100 | 396.6 | 100 | 396.6 | 100 | 366.6 | 100 | 336.6 |
| Mixing Equipment | Twin extruder | | | | | | | | | | | |
| Mixing Temp. | 193° C. (380° F.) | | | | | | | | | | | |
| Mixing Speed | 500 RPM | | | | | | | | | | | |
| Order of Addition of Ingredients | All together | | | | | | | | | | | |
| Form of Product After Mixing | Pellets | | | | | | | | | | | |
| Hardness, Shore A | 56 | | 51 | | 47 | | 45 | | 48 | | 53 | |
| 200° C. Rheology | | | | | | | | | | | | |
| viscosity @ 223/sec | 345 | | 290 | | 260 | | 250 | | 300 | | 325 | |
| viscosity @ 67/sec | 775 | | 625 | | 605 | | 560 | | 640 | | 660 | |
| Compression Set at 70° C. (%) | 47 | | 45 | | 44 | | 44 | | 45 | | 44 | |
| Substrate | SABIC Cycoloy C2950 PC/ABS | | | | | | | | | | | |
| Barrel temperature, ° C. | 215 | | | | | | | | | | | |
| Thicknesses of TPE and substrate | Substrate 1.5 mm, OM TPE 1.5 mm, total 3 mm | | | | | | | | | | | |
| Peel force measured location | 5.08 cm (2 inches) | | | | | | | | | | | |
| Force (Newtons/m) (lb/in) | 875 (5) | | 2102 (12) | | 2102 (12) | | 2277 (13) | | 2277 (13) | | 1401 (8) | |
| Failure mode | Adhesive | | Adhesive | | Cohesive | | Cohesive | | Cohesive | | Adhesive | |

TABLE 10

Series 5

| Series | 5A | |
|---|---|---|
| Example | 14 | |
| Weight Percent (%) or PHR | % | PHR |
| Septon 4055 | 24.32 | 100 |
| 550 viscosity oil | 19.46 | 80 |
| Plastolyn R1140 | 14.59 | 60 |
| Scilair 2714 | 5.84 | 24 |
| Skypel G130D | 35.26 | 145 |
| Kemamide B | 0.24 | 1 |
| Irgafos 168 | 0.15 | 0.6 |
| Irganox 1010 | 0.15 | 0.6 |
| Total | 100 | 411.2 |

TABLE 10-continued

| Series 5 | |
| --- | --- |
| Mixing Equipment | Twin extruder |
| Mixing Temp. | 193° C. (380° F.) |
| Mixing Speed | 500 RPM |
| Order of Addition of Ingredients | All together |
| Form of Product After Mixing | Pellets |
| Hardness, Shore A | 53 |
| 200° C. Rheology | |
| viscosity @ 223/sec | 310 |
| viscosity @ 67/sec | 640 |
| Compression Set at 70° C. (%) | 38 |
| Substrate | SABIC Cycoloy C2950 PC/ABS |
| Barrel temperature, ° C. | 215 |
| Thickness of TPE on substrate | 1.5 mm |
| Peel force measured location | 5.08 cm (2 inches) |
| Force (Newtons/m) (lb/in) | 1576 (9) |
| Failure mode | Cohesive |

In Series 2, the tackifier is effective raising Tan Delta of middle block. Tackifier is effective reducing flow mark and improve plaque surface smoothness. High vinyl TPE compound has lower flow mark and better smooth surface than the equivalent formulations in Series 1. At same Mw, the difference of Tg of styrene block and Tg of midblock determine the elasticity of HSBC flow, with a small Tg difference correlating to a low elasticity and better flow. High vinyl SEBS having a high midblock Tan Delta is less elastic and has better flow than standard SEBS at the same Mw. Series 2 uses a high vinyl SEBS. At same tackifier amount, Series 2 has a lower viscosity than the corresponding formulations of Series 1 and less flow mark. High vinyl SEBS is more suitable used as base TPE for OM purposes because less viscosity is very important for thin wall high L/D gasket design.

While the Series 3-6 experiments used COPE as bonding agent, it is expected to achieve the same or similar results using TPU as the bonding agent.

TABLE 11

Series 6

| Series | 6A | | 6B | | 6C | | 6D | | 6E | | 6F | |
| --- | --- | --- | --- | --- | --- | --- | --- | --- | --- | --- | --- | --- |
| Example | 15 | | 16 | | 17 | | 18 | | 19 | | 20 | |
| Weight Percent (%) or PHR | % | PHR | % | PHR | % | PHR | % | PHR | % | PHR | % | PHR |
| Septon 4055 | 5.7 | 25 | 5.44 | 25 | 5.29 | 25 | 5.14 | 25 | 5.11 | 25 | 5.41 | 25 |
| Kraton G1641 | 17.11 | 75 | 16.33 | 75 | 15.88 | 75 | 15.42 | 75 | 0 | 0 | 0 | 0 |
| Hybrar 7135 | 0 | 0 | 0 | 0 | 0 | 0 | 0 | 0 | 15.32 | 75 | 16.22 | 75 |
| 550 viscosity oil | 18.25 | 80 | 17.41 | 80 | 16.93 | 80 | 16.45 | 80 | 16.35 | 80 | 17.3 | 80 |
| Plastolyn R1140 | 11.41 | 50 | 13.06 | 60 | 14.82 | 70 | 16.45 | 80 | 16.35 | 80 | 12.98 | 60 |
| Dowlex 2035 | 6.84 | 30 | 7.18 | 33 | 7.41 | 35 | 7.81 | 38 | 8.38 | 41 | 7.79 | 36 |
| Exxolor VA1801 | 15.97 | 70 | 15.89 | 73 | 15.66 | 74 | 15.42 | 75 | 15.32 | 75 | 15.79 | 73 |
| Vicron 25-11 | 23.95 | 105 | 23.94 | 110 | 23.29 | 110 | 22.62 | 110 | 22.48 | 110 | 23.79 | 110 |
| Irganox 1010 | 0.16 | 0.7 | 0.15 | 0.7 | 0.15 | 0.7 | 0.14 | 0.7 | 0.14 | 0.7 | 0.15 | 0.7 |
| Irgafos 168 | 0.11 | 0.5 | 0.11 | 0.5 | 0.11 | 0.5 | 0.1 | 0.5 | 0.1 | 0.5 | 0.11 | 0.5 |
| Kemamide B | 0.5 | 2.2 | 0.48 | 2.2 | 0.47 | 2.2 | 0.45 | 2.2 | 0.45 | 2.2 | 0.48 | 2.2 |
| Total | 100 | 438.4 | 100 | 459.4 | 100 | 472.4 | 100 | 486.4 | 100 | 489.4 | 100 | 462.4 |
| Mixing Equipment | Twin extruder | | | | | | | | | | | |
| Mixing Temp. | 227° C. (440° F.) | | | | | | | | | | | |
| Mixing Speed | 500 RPM | | | | | | | | | | | |
| Order of Addition of Ingredients | All together | | | | | | | | | | | |
| Form of Product After Mixing | Pellets | | | | | | | | | | | |
| Hardness, Shore A | 50 | | 52 | | 52 | | 51 | | 49 | | 49 | |
| 200° C. Rheology | | | | | | | | | | | | |
| viscosity @ 223/sec | 740 | | 680 | | 630 | | 600 | | 480 | | 580 | |
| viscosity @ 67/sec | 1730 | | 1570 | | 1430 | | 1360 | | 1140 | | 1310 | |
| Compression Set at 70° C. (%) | 47 | | 48 | | 49 | | 52 | | 45 | | 45 | |
| Substrate | Ultramid 8333GHI PC | | | | | | | | | | | |
| Barrel temperature, ° C. | 237 | | | | | | | | | | | |
| Thickness of TPE on substrate | 1.5 mm TPE thickness | | | | | | | | | | | |
| Peel force measured location | 5.08 cm (2 inches) | | | | | | | | | | | |
| Force (Newtons/m) (lb/in) | 3503 (20) | | 2977 (17) | | 2977 (17) | | 2977 (17) | | 3853 (22) | | 3853 (22) | |
| Failure mode | Cohesive | | Cohesive | | Cohesive | | Cohesive | | Cohesive | | Cohesive | |

The following additional observations were noted for each of the Series of experiments.

In Series 1, the tackifier was effective raising Tan Delta of middle block which resulted in reduction of viscosity and improved flow. It was also effective reducing flow mark and improving plaque surface smoothness. There also was a reduction of compound viscosity which is very important for thin wall high L/D gasket design. It was also noted that the tackifier can significantly reduce hardness against a constant of 80 PHR of oil. That is very important to make soft OM grade. Oil can reduce hardness, but oil has detrimental effect on bonding. Tackifier does not have a major effect on bonding, allowing the bonding agent to do its work. Finally, the tackifier has no significant effect on 70° C. CS percentage.

In Series 3, 100 PHR of COPE was used. Good bonding is achieved for high L/D thin wall design.

By comparison in Series 4, 145 PHR of COPE was used. Lower hardness, better bonding and better flow were obtained with tackifier as expected from prior Series experiments. The 70° C. CS was below 50%. Robust bonding was achieved for a high L/D thin wall design.

In the single experiment of Series 5, no high vinyl SEBS was used. Bonding was lower and CS was better than equivalent example with high vinyl SEBS of experiment 4C.

In Series 6, a high Mw high vinyl SEBS G1641 and high Mw high vinyl isoprene Hybrar 7135 were used. 70° C. CS is below 50%. Robust bonding and good flow were achieved for high L/D thin wall design.

The results of the Examples demonstrated that major soft phase part of the compound is the HSBC, oil, etc. while the minor part was the hard phase of bonding agent. The use of a HSBC compound preferably uses a weight average molecular weight of at least 300,000 with a preference for at least part of the HSBC to be high vinyl, either a high vinyl SEBS or a high vinyl isoprene. The tackifier is used to raise the Tan Delta of the middle block of the styrene block copolymer. As a result, the compound has improved wetting and bonding, reduce hardness, and lower viscosity, all without compromise of compression set. A high soft point tackifier is preferred. The bonding agents to assist in overmolding efficiency can be identified as COPE or TPU or both with a polar substrate such as polycarbonate or a maleic polyolefin or SBC with a polar substrate as polyamide.

The invention is not limited to the above embodiments. The claims follow.

What is claimed is:

1. A thermoplastic elastomer compound, comprising:
   (a) hydrogenated styrenic block copolymer;
   (b) oil;
   (c) more than 30 parts of a midblock tackifier per one hundred parts of the copolymer;
   (d) bonding agent for overmolding of the thermoplastic elastomer compound to a polar polymeric substrate,
   wherein the compound has a compression set of less than about 50% when tested at 70° C. for 22 hours using ASTM D395 Test Method B; and
   wherein the tackifier raises the Tan Delta of the midblock, resulting in a reduction of viscosity as compared with a midblock which is not tackified.

2. The compound of claim 1, wherein the copolymer has a midblock and the tackifier modifies the property of the midblock.

3. The compound of claim 1,
   wherein the bonding agent is selected from the group comprises thermoplastic polyurethane if the polar polymeric substrate is selected from the group consisting of polycarbonate (PC), a blend of polycarbonate and acrylonitrile butadiene styrene (PC/ABS), and a blend of polycarbonate and polybutadiene terephthalate (PC/PBT); and
   wherein the bonding agent comprises a copolyester elastomer if the polar polymeric substrate comprises polyamide.

4. The compound of claim 1, wherein the hydrogenated styrenic block copolymer is selected from the group consisting of styrene-ethylene-butylene-styrene (SEBS); styrene-ethylene-ethylene-propylene-styrene (SEEPS) styrene-isoprene/butadiene-styrene (SIBS); styrene-ethylene-propylene-styrene (SEPS); styrene-isoprene-styrene (SIPS); and combinations thereof.

5. The compound of claim 4, wherein the hydrogenated styrenic block copolymer has a high vinyl content.

6. The compound of claim 1, wherein the hydrogenated styrenic block copolymer has a weight average molecular weight of 300,000 and above.

7. The compound of claim 1, wherein the tackifier is an amorphous, low-molecular-weight hydrocarbon resin derived from aromatic petrochemical feedstocks and is fully hydrogenated to a saturated cyclo-aliphatic structure that is highly compatible with polyolefin polymers.

8. The compound of claim 1, wherein the compound further comprises hardness adjusters, waxes, and antioxidants.

9. The compound of claim 1, wherein the compound has the following parts per one hundred parts of hydrogenated styrenic block copolymer:

| | |
|---|---|
| Midblock Tackifier | 30-130 |
| Oil | 30-130 |
| Bonding agent for overmolding | 60-200 |
| Hardness Modifier | 0-60 |
| Wax | 0-3 |
| Anti-oxidant | 0-3. |

10. An overmolded molded article, comprising the thermoplastic elastomer compound of claim 1 as an overmolding layer and the polar polymeric substrate as the overmolded layer;
    wherein the polar polymeric substrate is selected from the group consisting of polycarbonate (PC), a blend of polycarbonate and acrylonitrile butadiene styrene (PC/ABS), and a blend of polycarbonate and polybutadiene terephthalate (PC/PBT) if the bonding agent comprises thermoplastic polyurethane; and
    wherein the polar polymeric substrate comprises polyamide if the bonding agent comprises a copolyester elastomer.

11. The article of claim 10, wherein the article is in the shape of a consumer electronic product.

12. The article of claim 10 wherein the overmolding layer does not cover the entire overmolded layer.

13. A method of using the compound of claim 1, wherein the method comprises the step of overmolding the thermoplastic elastomer compound on to the polar polymeric substrate.

* * * * *